United States Patent

Agra

[11] Patent Number: 6,050,558
[45] Date of Patent: Apr. 18, 2000

[54] INERTIAL SUSPENSION STABILIZER

[76] Inventor: Luis Alberto Agra, Olmos 643 - Villa Dominico, Buenos Aires, Argentina

[21] Appl. No.: 09/008,733
[22] Filed: Jan. 19, 1998
[51] Int. Cl.$^7$ .................................................. B60G 21/06
[52] U.S. Cl. ............................................. 267/186; 267/34
[58] Field of Search ................................... 267/34, 64.25, 267/186, 187, 191, 217, 218, 221, 222–226; 280/124.106, 124.102

[56] References Cited

U.S. PATENT DOCUMENTS

| | | | |
|---|---|---|---|
| 1,207,426 | 12/1916 | McNabb | 267/23 |
| 2,038,032 | 4/1936 | Flynn | 267/34 |
| 2,237,915 | 4/1941 | Routson | 267/34 |
| 2,877,872 | 3/1959 | Krizan | 188/275 |
| 4,641,856 | 2/1987 | Reichenbach | 280/5.511 |
| 4,973,077 | 11/1990 | Kuwayama et al. | 280/124.107 |
| 5,016,909 | 5/1991 | Lin | 280/5.508 |

*Primary Examiner*—Chris Schwartz
*Attorney, Agent, or Firm*—Bachman & LaPointe, P.C.

[57] ABSTRACT

A pneumatic cylinder, inside which a piston is displaced and which defines two chambers. The chambers are communicated through a first conduit passing through the piston and a second conduit at the ends of which there are variable flow valves. The first conduit has an adjustable valve. The load at any air chamber results in a working load which causes contact of the wheel with the ground for a longer period of time. An expansion spring is located at the lower air chamber. The piston is engaged with means for sensing its displacement. The invention could be applied to any kind of vehicle.

14 Claims, 1 Drawing Sheet

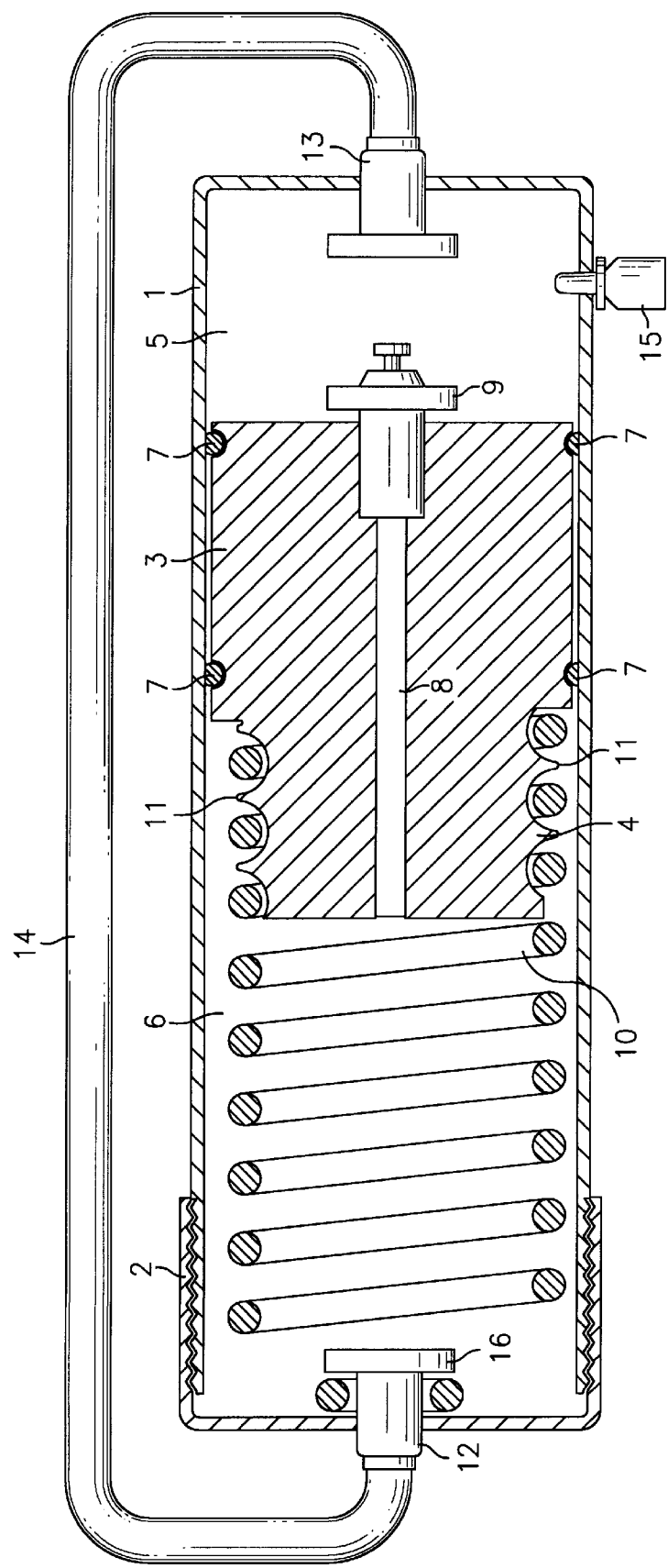

INERTIAL SUSPENSION STABILIZER

FIELD OF THE INVENTION

The instant invention relates to devices intended to stabilize vehicles, and more particularly it relates to an inertial suspension stabilizer.

BACKGROUND OF THE INVENTION

Due to the speed increase in vehicles, suspension systems had to be combined with systems for maintaining stability upon bad maneuvering, sudden turns and uneven ground.

Thus, stabilizing bars have been included to limit car inclination, in some cases by using threaded telescopic connecting rods.

Torsion bars are replaced by hydraulic lacks, whether commanded or not.

The following Argentine patents are incorporated herein in their entirety as references.

Patent No. 084,607 discloses a vehicle stabilizer intended to avoid side sliding and the resulting disadvantages. This stabilizer avoids sudden falls due to road irregularities which cause damage in tires and upward vertical rebounds. In part, these movements are counteracted by the shock absorbing system. The stabilizing effect is obtained by inertial reaction of a floating mass opposing the initial propulsion of the force producing abnormal movements. This stabilizer comprises a suspended floating mass, which is able to slide in all directions up to a preset limit determined by resilient attachments connected on one side to the mass and on the other to a container box.

Argentine patent No. 159,750 discloses a pair of rods located transversally to the vehicle; the ends of each of said rods being connected, by means of resilient members, to the arms supporting the wheels. The ends of the other rod are engaged to the ends of the torsion bar. Mean points of the rods are connected to the rocker arm and are able to command a distributor located on the feeding circuits of the means joining the bar with the arms by applying fluid for assuring box inclination.

Patent No. 165,886 discloses improvements over patent No. 159,750 wherein a jack has more than one compartment constituting a servo-engine. One of the fluid circulation channels has a load loss device separated into two compartments of differential pressure through a central partition with reverse effect valves and mounted on springs.

Patent No. 242,156 discloses a pair of bars having a longitudinal portion with its ends folded orthogonally according to an opposite direction thus forming a lever. An end portion is shorter and is connected to the suspension assembly of a wheel train; the distal end pivots at a point adjacent a wheel diagonally located in the remaining wheel train.

SUMMARY OF THE INVENTION

Basically, the instant invention is comprised by a cylinder having therein a piston of preset mass, which defines two air chambers connected therebetween by means of a first conduit crossing said piston which is provided with a regulation valve and a second conduit communicating with both chambers and having corresponding valves.

An expansion spring is provided into one of said chambers; further, means for sensing piston displacement are provided at one of the chambers.

BRIEF DESCRIPTION OF THE DRAWINGS

The single FIGURE of the drawings is a longitudinal section of the inertial suspension stabilizer of the invention.

DETAILED DESCRIPTION OF THE PREFERRED EMBODIMENTS

In the present specification, the same reference numerals designate the same or equivalent parts.

Reference numeral 1 designates the upper portion of the cylinder body; 2 designates the lower portion of the cylinder body; 3 designates the piston main body and reference numeral 4 designates the smaller diameter projection of the piston.

Reference numeral 5 designates the upper air chamber; 6 the lower air chamber and 7 the piston seals.

Reference numeral 8 designates a first conduit; 9 designates a regulating valve and 10 an expansion spring.

Reference numeral 11 designates a thread at the piston projection; 12 designates a lower variable flow valve and 13 designates the upper variable flow valve.

Reference numeral 14 designates a second conduit and with the reference numeral 15 a sensor.

Operation

A description of the functional and operational relationship of the forming elements follows.

In order to balance the shock caused by ground irregularities, the instant invention is supported by the wheel shaft thus decreasing the damper work since it diminishes the load thereto.

Thus, contact with the ground is maintained a longer time preventing the vibrations produced by dampering and suspension.

The cylinder body, comprised by an upper section 1 and a lower section 2 is connected to the wheel shaft (not shown).

Inside the cylinder (1-2) there is a piston comprised by a main body 3 and a smaller diameter projection 4 projecting downwardly.

Piston (3-4) has a weight determined by the vehicle type, being equivalent to the proportional weight of the wheel shaft (not shown).

Piston (3-4) defines corresponding air chambers, an upper chamber 5 and a lower chamber 6 having seals 7 for assuring tightness therebetween.

A first conduit 8 is made through said piston (3-4) such that both, the upper chamber (5) and the lower chamber (6), are communicated thereby.

At the piston main body (3) there is an adjustable valve 9 for monitoring air passage through said first conduit (8) between the upper and lower chambers (5-6).

At the lower chamber (6) there is an expansion spring 10 whose upper end is fixed to projection (4) of the piston by means of a thread 11 thereon and whose lower end is connected to the variable flow valve 12 acting as a retainer and which includes retention means (16) for spring (10) contained inside the cylinder.

At the upper portion of the cylinder body (1) a second variable flow valve 13 or upper valve is located, which communicates with the upper air chamber (5) and, by means of a second conduit 14, with the first valve or lower valve (12).

The invention also contemplates a sensor 15 for sensing piston (3-4) displacement located at any of the two chambers (5-6).

Due to the regulation of valve (9) air passage from one chamber to the other (5-6) is established, attaining compression or decompression of the inertial mass constituted by piston (3-4).

Upon variation of the air flow passing through the first conduit (8), regulation of valve (9) achieves a load difference and, consequently, a difference in the weight and working load values.

When the load at the upper air chamber (5) is increased, the expansion spring (10) tends to compress, thus compensating the higher load with the upper variable flow valve (13) which allows the air excess through the second conduit (14) in the direction of the lower air chamber (6) to which it will enter through the lower variable flow valve (12).

Upon increase of the load at said lower chamber (6), the expansion spring (10) tends to expand and air will tend to pass to the upper chamber (5) through the first conduit (8) and through adjustable valve (9), thus compensating the circuit.

When the sensor (15) is connected, it is possible to determine the displacement of piston (3-4).

In this specification, a wheel shaft (not shown) to which the inertial suspension stabilizer is connected has been mentioned. It is obvious that the stabilizer of the invention may be located at the supports of skids of snow or sea vehicles and also at vessel shells.

An example of application of the inertial suspension stabilizer in competition motorcycles is as follows.

In frontside suspensions the invention is subjected to the bar or just In the axle of the wheel.

The results obtained after proving made on test prototypes in different types of suspensions are:

1. Reduce lineal knocks and speeds of suspensions, proportionally from 10% to 60% less, maintaining the suspension with more equilibrium.

2. Maintain the wheel for more time in contact with the ground by the inertial effect of action and reaction, because the mass is opposed by inertia to the movement (action) and its expansion spring is also opposed to the change, by means of the mass and return of the action (reaction), so as in that way to find a proportional equilibrium action-reaction from the suspension, giving an optimum result in all different pavements.

3. A big diminution of the horizontal movement of the frontside suspension (shimmy). The wheel works free as a gyroscope, which causes a vertical stability, it is opposed to the change of movement. If any external reason (holes, stones, etc) changes its position, it begins to lose stability and shimmy is produced. The invention tends to reduce or annul (in some cases) the drive effort, to return the front actions of the inertial forces and they are opposed to the unbalanced ones. The best theoretical explanation is that when a lineal vertical movement of the mass is found (from upside to downside and viceversa) it is opposed to the horizontal change (from one side to the other or from right to left), by the moving alternative mass effects.

In backside suspensions effects are similar to the frontside ones, with the advantage of reducing the suspension knock and to be found with progressive and proportional weight mass by means of gravity plus a spring of the same magnitude (progressive) plus the air charge between the mass and the spring (inferior path) that works in relation to the speed of the mass.

The result is a better wheel contact with the ground, better traction and braking, better stability when it turns and better speed of rebound.

The inertial suspension stabilizer has two chambers besides the mass and the expansion and compression springs, one in downside and one upside, which are connected through the mass or the piston by means of valves, that have the same function as the hydraulic suspension valves by means of balancing the high and low speeds of liquid in hydraulic suspension or the air in the inertial system.

The following are the motorcycles and models tested by the inventor in reference with his inertial suspension stabilizer:

Honda CR 125 and CR 250; Honda XR 250 and XR 600; Suzuki RM 125 and RM 250; Suzuki DR 350; Kawasaki KX 125 and KX 250; Kawasaki KLX 250 and KLX 650; Yamaha YZ 125 and YZ 250; and Husqvama TE 350 and TE 610.

An exemplary embodiment of the invention has been described, including constructive and operational features, all of which are encompassed by the attached claims.

What is claimed is:

1. An inertial suspension stabilizer, which comprises: a pneumatic cylinder; a determined mass piston in said cylinder; two air chambers in said cylinder defined by said piston; a first conduit through said piston connecting said air chambers; an adjustable valve for said first conduit; a second conduit having a flow path communicating with both chambers; corresponding first and second variable flow valves for said second conduit spaced from each other and positioned in said flow path between said chambers; an expansion spring in one of said chambers; and means for sensing displacement of said piston upon engagement with said piston.

2. The inertial suspension stabilizer as claimed in claim 1, wherein the piston has at its base a smaller diameter projection into which a portion of the expansion spring is housed.

3. The inertial suspension stabilizer as claimed in claim 2, wherein said smaller diameter projection is threaded, defining a retainer for said spring.

4. The inertial suspension stabilizer as claimed in claim 3, wherein the spring expands between the thread formed at the smaller diameter projection of the piston and a stop provided by one of the valves of the second conduit.

5. The inertial suspension stabilizer as claimed in claim 1, wherein the first and second variable flow valves are located at the ends of the second conduit and are adjustable valves.

6. The inertial suspension stabilizer as claimed in claim 5, wherein said first and second variable flow valves are located at both ends of said cylinder.

7. The inertial suspension stabilizer as claimed in claim 6, wherein one of said variable flow valves includes a retention means for the spring contained inside said cylinder.

8. The inertial suspension stabilizer as claimed in claim 1, wherein the adjustable valve for the first conduit is housed in one of said chambers.

9. The inertial suspension stabilizer as claimed in claim 8, wherein the first conduit passes through the piston in a longitudinal direction.

10. The inertial suspension stabilizer as claimed in claim 1, wherein the adjustable valve for the first conduit is housed in the piston.

11. The inertial suspension stabilizer as claimed in claim 1, wherein said piston has a main body with tight seals therein.

12. The inertial suspension stabilizer as claimed in claim 1, wherein said pneumatic cylinder is comprised of two parts coupled together.

13. The inertial suspension stabilizer as claimed in claim 1, wherein the second conduit passes outside of the pneumatic cylinder.

14. The inertial suspension stabilizer as claimed in claim 1, wherein only one of said chambers is provided with an expansion spring.

* * * * *